June 23, 1959  G. S. BARAKÉ  2,891,440
METHOD APPLIED TO CINEMATOGRAPHIC SCENES TO OBTAIN
THREE DIMENSIONAL EFFECTS OF MOVING PICTURES
WITHOUT THE USE OF SPECIAL GLASSES
Filed June 6, 1955

INVENTOR.
Gabriel S. Baraké
BY *Wenderoth, Lind & Ponack*

ATTORNEYS

United States Patent Office 2,891,440
Patented June 23, 1959

2,891,440

METHOD APPLIED TO CINEMATOGRAPHIC SCENES TO OBTAIN THREE DIMENSIONAL EFFECTS OF MOVING PICTURES WITHOUT THE USE OF SPECIAL GLASSES

Gabriel Sélim Baraké, Alexandria, Egypt

Application June 6, 1955, Serial No. 513,257

2 Claims. (Cl. 88—16)

The present invention relates to a method of preparing moving picture film having three dimensional effects for viewing with the naked eye without the use of special glasses. It deals particularly with a new method of preparing the said scenes on a virgin ciné film in such a way as to obtain the required effect.

The invention is based on the idea of projecting a fixed scene from a cinematographic film onto the surface of a white screen surrounded by a black frame, so that the extremities of the scene will not be visible, having fallen on the said black frame. Selected prominent parts of the extremities of the scene are then made visible by whitening their exact location on the black frame with white paint. This resultant semi-relief scene is then photographed by a ciné-camera on a new film. The above mentioned procedure is continued for any consecutive series of scenes, following the same system adopted in filming moving pictures.

The invention will now be described with reference to the accompanying drawings.

Figure 1:
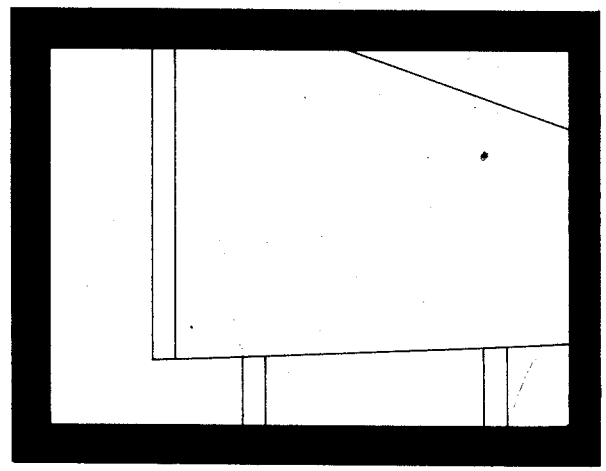
Fig. 1 shows a fixed scene projected on the surface of a white screen surrounded by a black frame, the extremities of the scene not being visible because of having fallen on the black frame.

When a given scene of any moving picture film is projected by a properly focused projection device on a black glass screen of total dimensions 40 x 24 cms. (or a black wooden screen or the like), having in its middle a white area, such as white paper 32 x 26 cms., only that part of the scene which falls on the white paper will be visible. The extremities thereof extending onto the black glass border, will obviously not show (see Fig. 1).

In order to obtain a picture in semi-relief of the picture projected on both the white paper and the black border, selected prominent parts of the extremities of the scene are made visible by whitening their exact location on the black border with white paint.

It is clear that the extremities of the scene which go beyond the white paper will not be visible on the black border. On the other hand, the selected prominent parts thereof will be clearly apparent when their exact location on the black glass border has been whitened (see Fig. 2).

Figure 2:
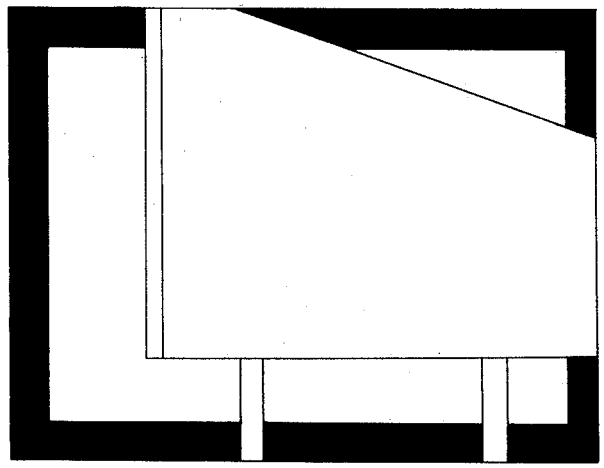
Fig. 2 shows the same scene transformed into semi-relief after the selected prominent parts of the extremities of the scene have been made visible by whitening their exact location on the black frame with white paint.

After going through the said process of whitening the black border of the first scene, there is obtained a semi-relief effect because of the appearance of the parts protruding beyond the white screen, showing on the black border, as can be seen in Figure 2. This fixed semi-relief scene is then photographed by a ciné-camera on a new film.

The cinematographic film the scenes of which are required to be transformed into semi-relief, is projected on the surface of both the white screen and black border. The scenes thus appearing one after other are treated in succession in a similar fashion to the first by whitening those portions of the black border which correspond to the selected prominent part of each and they are then photographed separately.

The procedure suggested here, to photograph the consecutive fixed scenes, is that adopted in filming moving pictures.

When a film made under this new method is projected on any ciné screen, the moving pictures will appear with a black border around each of the scenes. Moreover, portions of each of the scenes will appear in semi-relief as a result of having some parts protruding beyond the white screen and extending onto the black border.

Consequently, the three dimensions of the moving pictures will be most apparent, and the spectators' power of imagination greatly enhanced in this direction, particularly if the scenes contained in the projected film are distinct and well ordered. It is also to be noted that films of all kinds whether coloured or otherwise, and all sizes (8, 9.5, 16 and 35 mm.), and of all types (ordinary and wide screen), could be processed according to the said method for obtaining scenes in relief. It may be further stated that films prepared in accordance with this invention are readily adapted for use with any sort of ciné screen or television apparatus.

I claim:

1. A method of producing a negative for a picture with three dimensional effects, comprising providing a screen for projecting a picture thereon, the screen having a black border thereon, projecting a picture onto said screen such that the extremities of the projected picture will fall on said black border and will not be visible, whitening or coloring the portions of said black border onto which predetermined prominent portions of the extremities of the projected picture extend over the black borders so the said prominent portions projected onto the black border will be visible and will appear to extend toward the observer, and photographing the thus modified projected picture to produce a negative thereof.

2. A method of producing a negative for a picture with three dimensional effects, comprising providing a screen for projecting a picture thereon, the screen having a black border thereon, projecting a picture onto said screen, said screen and black border being of such a size in relation to the projected picture that portions of the extremities of the projected picture will not be visible for having fallen on the black border, coating the portions of said black border onto which predetermined prominent portions of the extremities of the projected picture extend over the black border with a material which will reflect light of at least one color so that the said prominent portions projecting onto the black border will be visible and will appear to extend toward the observer, and photographing the thus modified projected picture to produce a negative thereof.

References Cited in the file of this patent

UNITED STATES PATENTS

| | | |
|---|---|---|
| 1,260,221 | McCormick | Mar. 19, 1918 |
| 1,861,515 | Williams | June 7, 1932 |
| 2,011,581 | Hyde | Aug. 20, 1935 |
| 2,357,624 | Amdur | Sept. 5, 1944 |